Jan. 10, 1967   J. L. SPEIGLE   3,297,139
STORAGE APPARATUS AND INDEXING MECHANISM
Filed Jan. 6, 1965   3 Sheets-Sheet 1
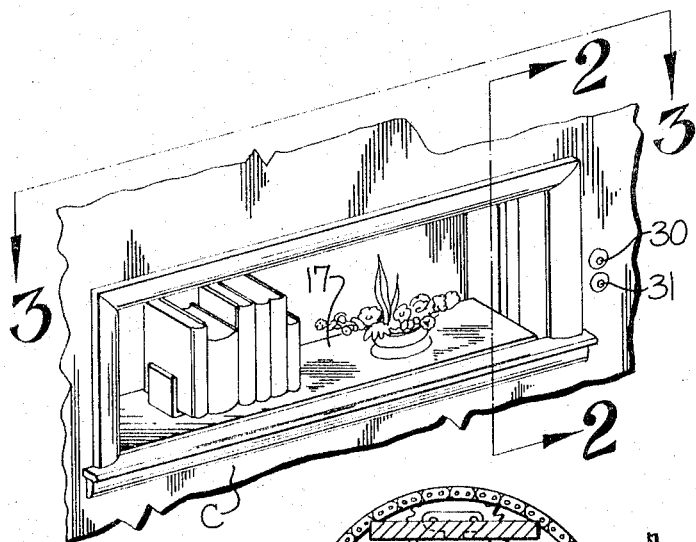
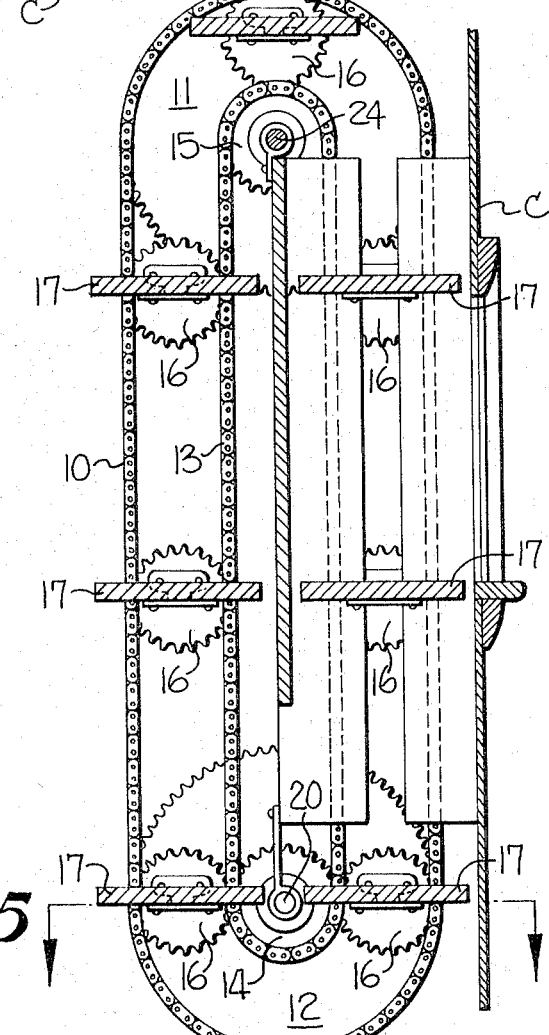
INVENTOR:
JAMES L. SPEIGLE
BY Garrett, Bell, Seltzer, Park & Heard ATTORNEYS

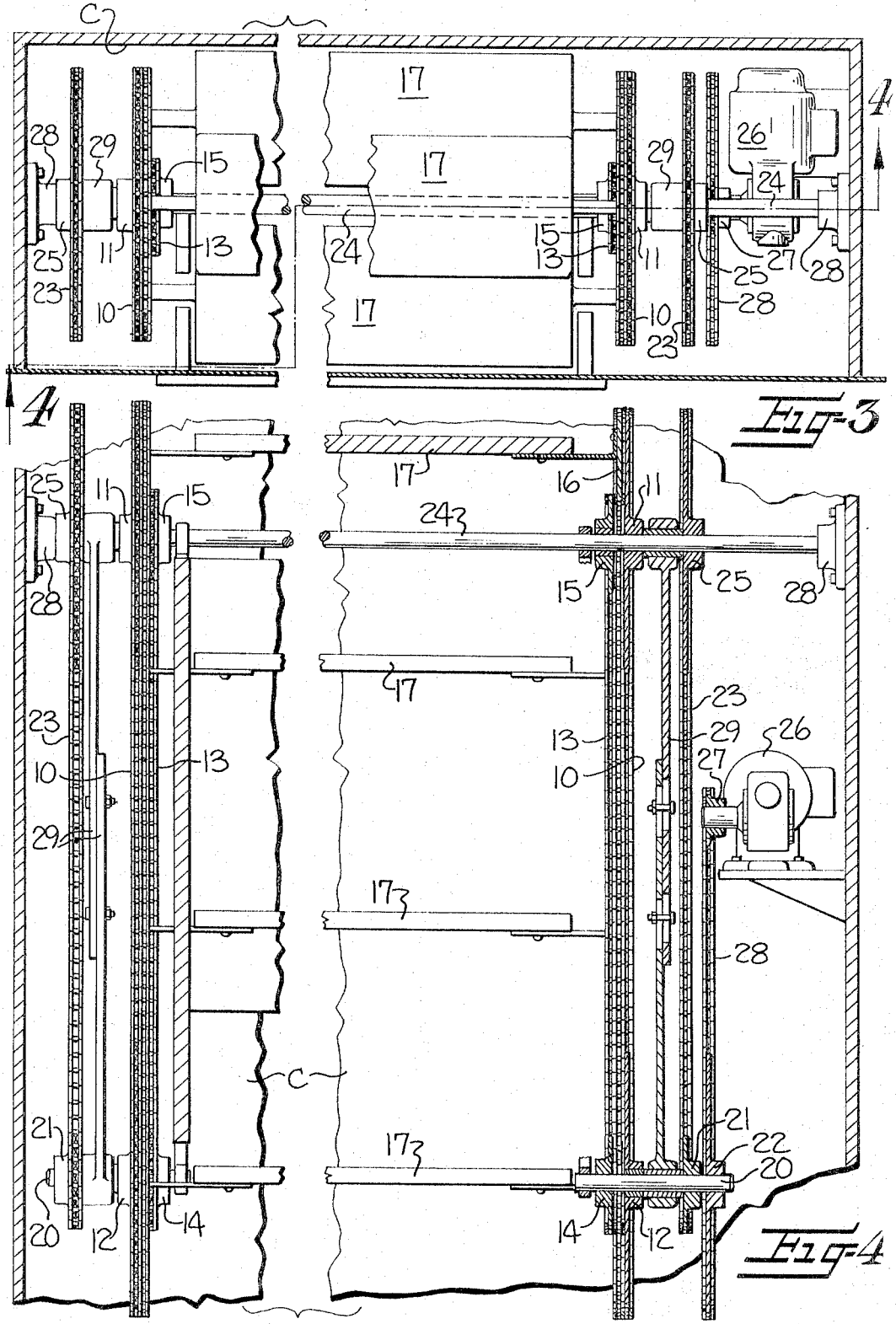

INVENTOR:
JAMES L. SPEIGLE

BY Parrott, Bell, Seltzer, Park & Heard
ATTORNEYS

United States Patent Office 3,297,139
Patented Jan. 10, 1967

3,297,139
STORAGE APPARATUS AND INDEXING
MECHANISM
James L. Speigle, 617 Bristol Drive,
Statesville, N.C. 28677
Filed Jan. 6, 1965, Ser. No. 423,725
5 Claims. (Cl. 198—85)

This invention relates to a storage apparatus characterized by having shelves which are movable to a number of various positions, and more particularly, to such a storage apparatus and indexing mechanism in which the shelves are maintained in a predetermined orientation while being indexed between their various positions.

Storage apparatus and indexing mechanism for such apparatus have previously been known in which article receiving support members, or shelves, are indexed to an access position, and such conventional storage apparatus are broadly of two types. The first of these types is a storage apparatus wherein the support members or shelves are movable vertically along a straight line path of travel and are easily maintained in the desired predetermined orientation by being fixed at their opposite ends to vertically movable members, such as cables or chains. However, this type of storage apparatus requires considerable space for even a small number of shelves and hence the storage capacity for a given amount of space is severely limited.

In the second type of conventional storage apparatus, the shelves are movable in a closed path of travel, and each shelf is maintained in the desired predetermined orientation as the same moves through the closed path of travel. While this second type of conventional storage apparatus provides considerably increased storage capacity for a given amount of space over the first type discussed above, several difficult problems and deficiencies have been encountered in the use thereof, particularly with the means for maintaining the shelves in the desired predetermined orientation as they are moved in the closed path of travel. In this respect, relatively complicated linkages or guide track arrangements have been heretofore substantially universally used for this purpose and such linkages and guide tracks have limited the usefulness of this storage apparatus since the same must be carefully adjusted in order for the storage apparatus to smoothly and properly operate in presenting successive shelves to the desired access location. Further, such linkages and track arrangement usually limit severely the relative placement of the support members and hence the number of shelves which may be used in an apparatus of a given size, as interference between adjacent linkages operating to maintain adjacent shelves in the desired orientation would cause the storage apparatus to jam and become inoperative. Still further, the complexity of these linkage and track arrangements and the method of attachment of the shelves thereto have been such as to render the installation or removal of any given shelf a difficult and time consuming job. As a result, these conventional storage apparatus are not readily adapted to placing support members into any desired position for use, as would be required where articles of varying heights are to be stored on the shelves of a storage apparatus.

It is an object of this invention to provide an improved storage apparatus with increased storage capacity for a given space, and having at least one support member movable in a closed path of travel in a predetermined orientation, which apparatus obviates the problems and deficiencies of conventional storage apparatus using linkages and tracks to obtain a similar result.

A more specific object of this invention is to provide an improved storage apparatus in which at least one support member is carried in a closed path of travel and in a predetermined orientation and in which a support member may be easily removed and replaced at any desired location relative to any other support member.

A further object of this invention is to provide an improved indexing mechanism for moving elements along a predetermined path of travel and maintaining those elements in predetermined orientations.

Some of the objects of the invention having been stated, other objects will appear as the description proceeds, when taken in connection with the accompanying drawings, in which:

FIGURE 1 is a perspective view of the exterior of a portion of the storage apparatus constructed in accordance with this invention;

FIGURE 2 is an end view, in section, of a storage apparatus of FIGURE 1, taken along the line 2—2 in FIGURE 1;

FIGURE 3 is a top view of the storage apparatus and mechanism of FIGURE 1, taken along the line 3—3 in FIGURE 1;

FIGURE 4 is a flat or elevation view, in partial section, of the storage apparatus and mechanism of this invention, taken along the line 4—4 in FIGURE 3;

Figure 5:
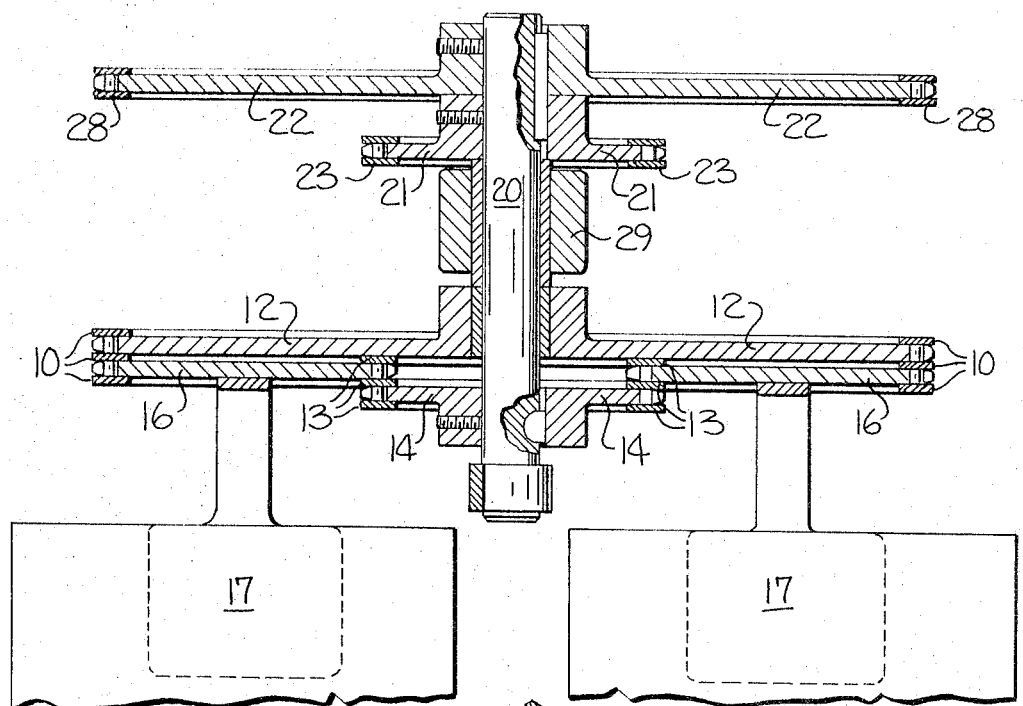
FIGURE 5 is a top view, in partial section, of a portion of the mechanism of this invention, taken along the line 5—5 in FIGURE 2.

Briefly, the storage apparatus and mechanism of this invention provides at least one stored article receiving member, or shelf, which is positively maintained in a predetermined orientation while moved to various positions for access or storage. The storage member is fixed to and moves with a support sprocket which is disposed between and supported by two endless flexible members, which are sprocket chains. The sprocket chains move along spaced paths and at the same lineal speed. As a result of the space and speed relationships of the chains, the sprocket is stationary with respect to the chains while moving with the chains along a straight line path of movement, and rotates on the chains while moving with the chains along a curved path line of movement. The endless sprocket chains are supported by drive sprockets for movement along predetermined parallel closed paths, with one chain disposed within the area bounded by the other. The sprockets for the two chains are interconnected in order to assure movement of the chains with the desired speed relation. The chains are double width chains, supported by the drive sprockets in one width and supporting the sprockets disposed between the chains with the other width.

In greater detail, the storage apparatus and mechanism as shown in the drawings may be enclosed in a cabinet C, to conceal the mechanism from view, provide a more pleasing appearance, and where necessary preclude access to most of the articles stored within the apparatus. An access opening is provided in the cabinet C, as shown in FIGURES 1 and 2, and the shelves within the storage apparatus may be indexed to the access opening in order to gain access to articles stored on the shelves. As shown in FIGURES 3 and 4, a mechanism is provided at both sides of the access opening within the cabinet C for moving the support members along a predetermined path and maintaining the support members in a predetermined orientation. As the mechanism located on either side of the access opening is substantially identical, more detailed discussion will be confined to the mechanism on the right hand side of the access opening, as seen in those figures.

As may be seen in FIGURE 2, the mechanism of the storage apparatus incorporating this invention includes two endless flexible members. A first endless flexible member 10, which is a sprocket chain, is supported for movement along a predetermined path, which is established by a drive sprocket 11 and an idler sprocket 12 spaced vertically from the drive sprocket. A second endless flexible member 13, which is a sprocket chain similar to the first flexible member 10, is disposed within the area bounded by the first flexible member 10, and supported for movement along a predetermined path. The second endless flexible member 13 is supported for movement along a closed path determined by a drive sprocket 14 and an idler sprocket 15 spaced vertically from the drive sprocket, with the path of movement of the second flexible member 13 being parallel to and spaced from the path of movement of the first flexible member 10.

In order to provide storage shelves which are indexable to a variety of positions and are positively maintained in a desired orientation while being moved, I provide support sprockets 16 and support members 17 fixed to and carried by the support sprockets. The support sprockets 16 are disposed between and supported by the first and second chains 10, 13. As may be understood, the teeth of the sprockets 16 extend into and engage the links of the endless chains 10, 13 to be carried with the chains as they move along their paths of movement defined by the sprockets.

Figure 6:
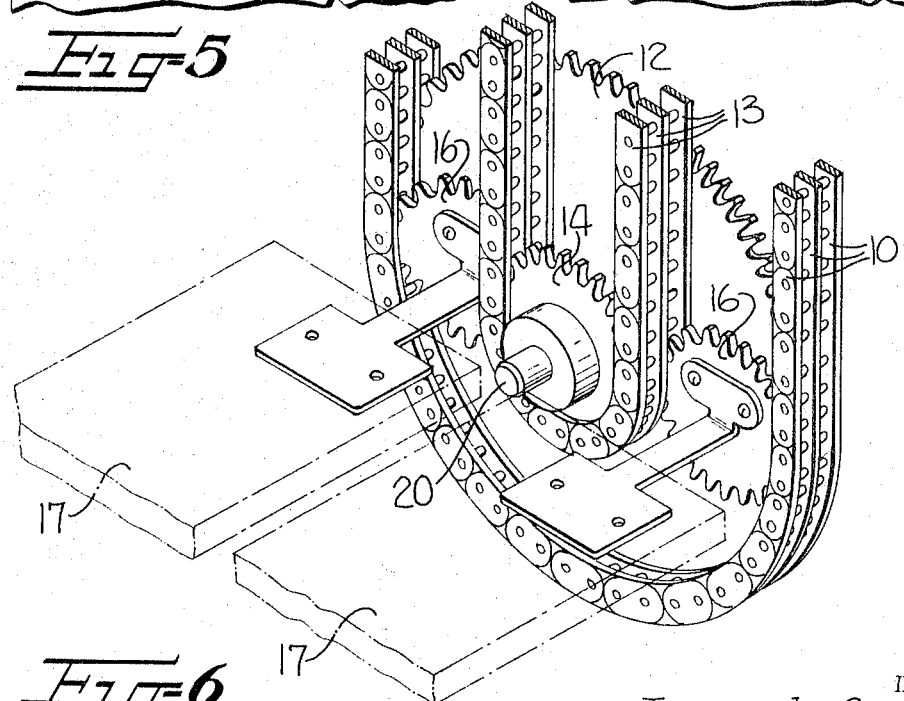
FIGURE 6 is a perspective view of a portion of the mechanism of a storage apparatus incorporating this invention.

The relationships of the chains 10, 13 and the various sprockets may be more clearly understood from FIGURE 6, where it may be seen that the chains are double width chains. As there shown, the idler sprocket 12 engages a first width portion of the first sprocket chain 10. Similarly, the drive sprocket 14 engages a first width portion of the second sprocket chain 13. The second width portions of both chains 10, 13 lie in a single plane, and a support sprocket 16 engages this second with portion of both chains.

In order to assure that the support sprockets 16 and the support members or shelves 17 fixed to those sprockets are maintained in the desired predetermined orientation at all points as they are carried by the endless chains 10, 13, I provide that the endless chains 10, 13 are moved at the same lineal speed. That is, by virtue of the movement of the chains at the same lineal speed, the support sprockets 16 are held fixed relative to the chains so long as the chains move in a straight line path, as for instance from the bottom of the apparatus in FIGURE 2 upwardly toward the top. As the chains move into a curved path, for instance extending around the sprockets at the top or bottom of the apparatus in FIGURE 2, the requirement of the chains to move at the same lineal speed causes them to move at differing rotational speeds, in a ratio dependent upon the radii of the sprockets used in the apparatus. As a result of the varying rotational speeds, the support sprockets 16 rotate on the chains, and are maintained in a constant orientation while moving along the curved paths.

In order to assure that the chains are restricted to the required relation of movement, I provide means operatively connecting the sprockets supporting the first and second chains 10, 13. This means for assuring proper movement of the sprocket chains 10, 13 is shown in FIGURES 3–5. As may be seen there, a lower shaft 20 is supported in a suitable manner within the cabinet C and is fixed to the drive sprocket 14 for the second flexible member 13 to carry the drive sprocket 14 in rotation with the shaft. The idler sprocket 12 for the first flexible member 10 is journaled on the shaft 20 to rotate freely about the shaft. Outwardly of the drive sprocket 14 and idler sprocket 12 is a first regulator sprocket 21, fixed to the shaft 20, and a power drive sprocket 22, also fixed to the shaft 20. The regulator sprocket 21 is engaged by a regulator chain 23.

At the upper end of the storage apparatus and mechanism, as shown in FIGURE 4, is a shaft 24, suitably supported for rotation within the cabinet C. The upper shaft 24, in similarity to the lower shaft 20, extends through the drive sprocket 11 and idler sprocket 15, with the drive sprocket 11 being fixed to the upper shaft 24 for rotation with that shaft, while the idler sprocket 15 is journaled on the upper shaft 24 to rotate freely on that shaft. The outer end of the upper shaft 24 carries a regulator sprocket 25, fixed to the upper shaft 24 and engaging the regulator chain 23. The diameter of the lower regulator sprocket 21 is identical to the diameter of the sprockets 14, 15 supporting the second flexible member 13, while the diameter of the upper drive sprocket 25 is the same as the diameters of the sprockets 11, 12 supporting the first flexible member 10. The engagement between the drive sprockets for the two flexible members 10, 13 established by the regulator chain, regulator sprockets and the attachment of the drive sprockets 11, 14 to the shafts carrying the regulator sprockets assures that the drive sprockets rotate at a ratio of rotational speeds, corresponding to the ratio of the drive sprocket diameters, such that the peripheral speed of the drive sprockets is the same. This equal peripheral speed of the drive sprockets assures movement of the chains at the same lineal speed.

The lower and upper shafts 20, 24 are supported within the cabinet C in such a manner as to permit adjustment of the vertical distance between the shafts to control the relative slack in the flexible members 10, 13. As best shown in FIGURE 4, the upper shaft 24 is supported for rotation in bearings 28 fixed to the cabinet C. The vertical displacement of the lower shaft 20 from the upper shaft 24 is established by vertical support members 29, which are journaled on and depend from the upper shaft 24. Each vertical member 29 is journaled to a lower shaft 20 to support that shaft for rotation, and each is adjustable in length to vary the vertical displacement of the shafts and thus vary the slackness of the endless flexible members.

In order to index the support members 17 of my storage apparatus and mechanism, I prefer to drive the lower and upper shafts 20, 24. This may be accomplished by using an electrical gearmotor 26, suitably supported within the apparatus cabinet C. The output shaft from the gearmotor 26 carries a motor sprocket 27, and a drive chain 28 engages the motor sprocket 27 and the power drive sprocket 22 carried by the lower shaft 20. When the gearmotor 26 is actuated, the lower shaft 20 is driven, and the regulator chain 23 causes the upper shaft 24 to be driven carrying the two flexible members 10, 13 and the support brackets 16 and support members 17 along their respective predetermined paths of movement. Preferably, when an electrical gearmotor 26 is used, push button controls are provided on the exterior of the cabinet C to permit a selection of the direction of movement of the shelves. For instance, a first control button 30 may initiate operation of the gearmotor 26 in a direction to cause the shelves to move upwardly past the access opening, while a second control button 31 may cause downward movement of the shelves past the access opening. Further, where the load to be placed upon the support members 17 is relatively small and properly distributed among a number of support members available, it is possible to dispense with the drive motor and move the shelves manually.

While the mechanism has been described with particular attention to the right-hand side of the storage apparatus of this invention, as shown in FIGURES 2–6, it is to be understood that a similar mechanism may be employed on the left-hand side of the storage apparatus, as shown for instance in FIGURES 3 and 4, to entirely assure that both ends of the storage members 17 are maintained in the desired predetermined orientation. The left-hand mechanism is basically similar to the mechanism described in detail above, in that two double width chains are used, which are supported by drive and idler sprockets. Support sprockets are disposed between the chains and supported by them for movement along a predetermined path. The support sprockets and the support members 17 are thus positively maintained in the desired predetermined orientation. A regulator chain and regulator sprockets are used to assure proper coordinated movement of the drive sprockets for the two chains. The movement of the left-hand mechanism is coordinated with the movement of the right-hand mechanism by the upper shaft 24 which extends across the storage apparatus and is fixed to the upper drive sprocket and regulator sprocket of the left-hand mechanism.

In operation, a person desiring access to an artitcle stored on the shelf not presently before the access opening would cause the electrical gearmotor 26 to operate by depressing one of the control buttons 30, 31. Operation of the gearmotor 26 would be continued until the desired shelf was postioned before the access opening. The rotation of the gearmotor 26, driving the drive chain 28, would cause rotation of the lower shaft 20. This rotation drives the second flexible member 13 and, by the regulator chain 23, drives the upper shaft 24. The upper shaft 24, in turn, drives the first flexible member 10 and the left-hand mechanism. Due to the lineal speed relation between the first and second flexible members 10, 13, the support sprockets are carried by the flexible members along a path of movement spaced between the paths of movement of the flexible members, to index the various support members 17 to the access opening to the cabinet C and positively maintain the support members in the desired predetermined orientation.

In the drawings and specification there has been set forth a preferred embodiment of the invention and, although specific terms are employed, they are used in a generic and descriptive sense only and not for purposes of limitation, the scope of the invention being defined in the claims.

I claim:
1. A storage apparatus characterized by horizontally extending support members movable to various positions while being maintained in a predetermined orientation, the apparatus comprising:
   a first endless double width sprocket chain bounding a predetermined area,
   first sprocket means engaging a first width portion of the first chain for supporting the same for movement along a predetermined closed path,
   a second endless double width sprocket chain disposed within the area bounded by the first chain,
   second sprocket means engaging a first width portion of the second chain for supporting the same for movement along a predetermined closed path parallel to and spaced from the path of the first chain,
   at least one support sprocket disposed between and engaging a second width portion of each of the first and second chains and supported thereby for movement therewith,
   at least one horizontally extending support member fixed to and carried by a support sprocket and adapted to receive stored articles, and
   drive means operatively connected to the first and second sprocket means for rotating the sprocket means in a predetermined rotational speed relation to move the chains at the same lineal speed for maintaining the support sprocket and support member in a constant orientation as the support sprocket and support member move with the chains.

2. A storage apparatus characterized by horizontally extending support members movable to various positions while being maintained in a predetermined orientation, the apparatus comprising:
   a first endless double width sprocket chain bounding a predetermined area,
   first sprocket means engaging a first width portion of the first chain for supporting the same for movement along a predetermined closed path,
   a second endless double width sprocket chain disposed within the area bounded by the first chain,
   second sprocket means engaging a first width portion of the second chain for supporting the same for movement along a predetermined closed path parallel to and spaced from the path of the first chain,
   a plurality of spaced apart support sprockets disposed between and supported by a second width portion of the first and second chains for movement with the chains,
   a horizontally extending support member fixed to and carried by each support sprocket and adapted to receive stored articles, and
   an endless regulator chain operatively connected to the first and second sprocket means for rotating the same in a predetermined rotational speed relation at which the chains move at the same lineal speed for holding each support sprocket stationary relative to the chains as the sprocket moves along a straight line path and for rotating the sprocket between the chains as the sprocket moves along a curved path, whereby the associated support member is maintained in a constant horizontal planar orientation.

3. A storage apparatus as claimed in claim 2, further comprising:
   drive means operatively connected to the regulator chain for driving that chain to cause movement of the support sprockets and associated members to various positions.

4. A mechanism for moving elements along a predetermined path and for maintaining the elements in predetermined orientations, the mechanism comprising:
   a first endless double width sprocket chain bounding a predetermined area,
   first sprocket means engaging a first width portion of the first chain for supporting the same for movement along a predetermined closed path,
   a second endless double width sprocket chain disposed within the area bounded by the first chain,
   second sprocket means engaging a first width portion of the second chain for supporting the same for movement along a predetermined closed path parallel to and spaced from the path of the first chain,
   a plurality of support sprockets disposed between and supported by a second width portion of the first and second chains for movement therewith and adapted to engage elements to be moved along a predetermined path of a predetermined orientation,
   an endless regulator chain operatively connected to the first and second sprocket means for rotating the same in a predetermined rotational speed relation at which the chains move at the same lineal speed for holding each support sprocket stationary relative to the chains as the sprocket moves along a straight line path and for rotating the sprocket between the chains as the sprocket moves along a curved path, whereby the element is maintained in a constant orientation.

5. A mechanism as claimed in claim 4 further comprising:
   drive means operatively connected to the regulator chain for driving that chain to cause movement of the support sprockets to various positions.

(References on following page)

References Cited by the Examiner

UNITED STATES PATENTS

| | | | |
|---|---|---|---|
| 465,587 | 12/1891 | Thorp | 214—16.12 X |
| 557,948 | 4/1896 | Bever | 312—267 X |
| 2,745,706 | 5/1956 | Mendelsohn | 198—154 X |
| 2,830,714 | 4/1958 | Youtz | 198—85 X |
| 2,856,254 | 10/1958 | Paulos | 312—266 |

EVON C. BLUNK, *Primary Examiner.*

R. J. HICKEY, *Assistant Examiner.*